United States Patent [19]

Shibata

[11] Patent Number: 4,817,878
[45] Date of Patent: Apr. 4, 1989

[54] ROTATABLE TOOL POWER LOCK RETENTION APPARATUS FOR FOOD PROCESSOR

[75] Inventor: Koichiro Shibata, Seto, Japan
[73] Assignee: Cuisinarts, Inc., Greenwich, Conn.
[21] Appl. No.: 530,022
[22] Filed: Sep. 7, 1983
[51] Int. Cl.⁴ .............................................. B02C 18/18
[52] U.S. Cl. .................................. 241/282.2; 241/92; 241/101.2; 403/349
[58] Field of Search ................ 241/101.2, 282.2, 282.1, 241/92; 403/1, 361, 375, 382, 383, DIG. 4, 348, 349, 360

[56] References Cited

U.S. PATENT DOCUMENTS

| | | | |
|---|---|---|---|
| 1,424,743 | 8/1922 | Smith | 403/349 X |
| 2,307,507 | 1/1943 | Hutton | 403/361 X |
| 2,732,249 | 1/1956 | Siracusa | 403/DIG. 4 X |
| 2,905,217 | 9/1959 | Schmidt, Sr. | 241/282.2 |
| 3,493,022 | 2/1970 | Mantelet | 146/68 |
| 3,970,258 | 7/1976 | Mantelet | 241/282.1 |
| 4,127,342 | 11/1978 | Coggiola | 241/92 X |
| 4,200,244 | 5/1978 | Sontheimer | 241/282.1 |

FOREIGN PATENT DOCUMENTS 338856 11/1930 United Kingdom ................ 403/348

Primary Examiner—Howard N. Goldberg
Assistant Examiner—Joseph M. Gorski
Attorney, Agent, or Firm—Parmelee, Bollinger & Bramblett

[57] ABSTRACT

Power lock tool retention apparatus for a food processor includes at least one flattened section on the drive shaft with an associated horizontal notch. A socket extending downwardly on the inside of the rotary tool hub is placed onto this drive shaft during manual installation of the tool so that rotation of the shaft will cause the tool to be rotated. At least one horizontal lip is provided in the socket at an elevation to become aligned with the notch on the drive shaft when the hub has been slid down vertically into its operating position on the shaft. The socket configuration is complementary to, but slightly different from, the flattened configuration of the drive shaft in order to permit a small amount of relative angular movement between the shaft and hub when the shaft commences to rotate. This small relative rotation produced by the torque of the motor drive when the food processor is started causes the horizontal lip to engage in the horizontal notch as the shaft starts to be rotated, thereby locking the tool onto the shaft during operation for preventing the tool from being dynamically lifted. When the food processor is stopped, engagement and removal of the tool from the drive shaft is achieved by manually turning the tool for disengaging the lip from the notch, thus permitting removal of the tool from the shaft.

19 Claims, 3 Drawing Sheets

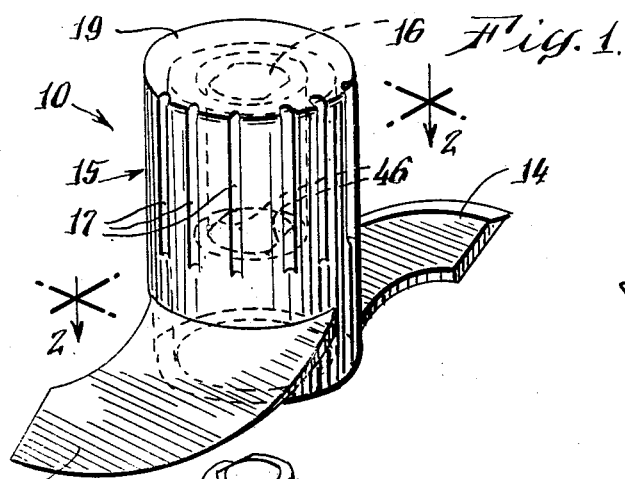
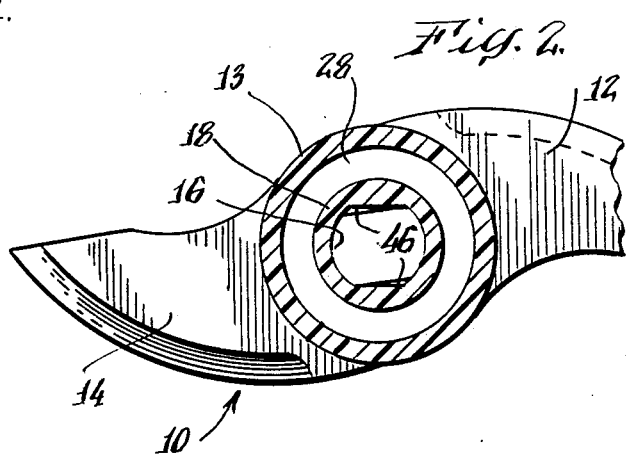
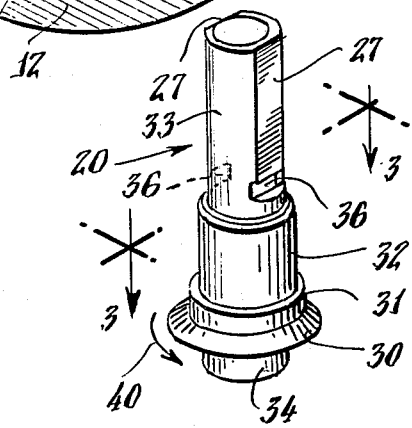
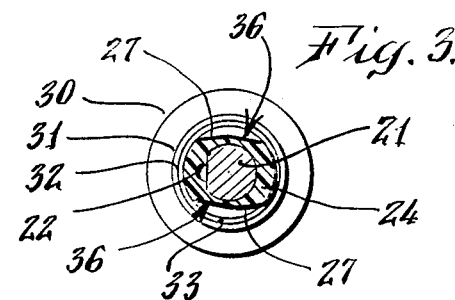
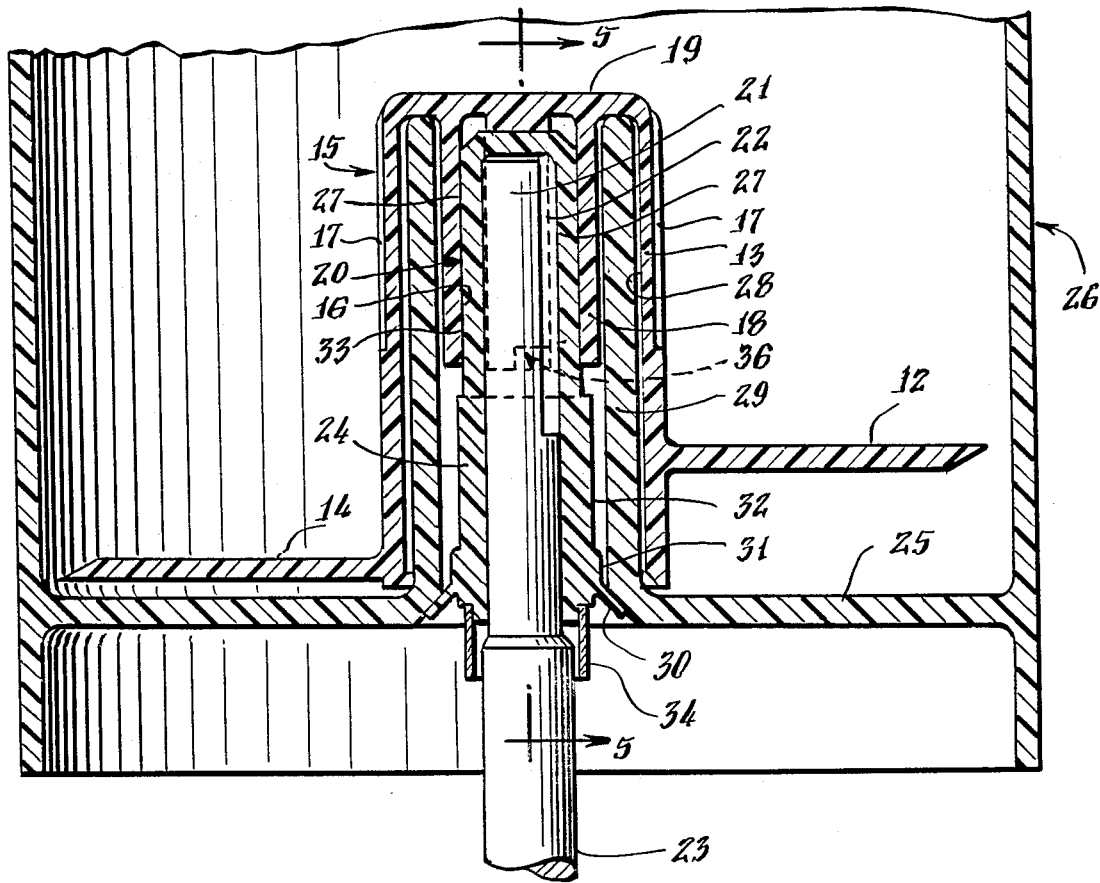

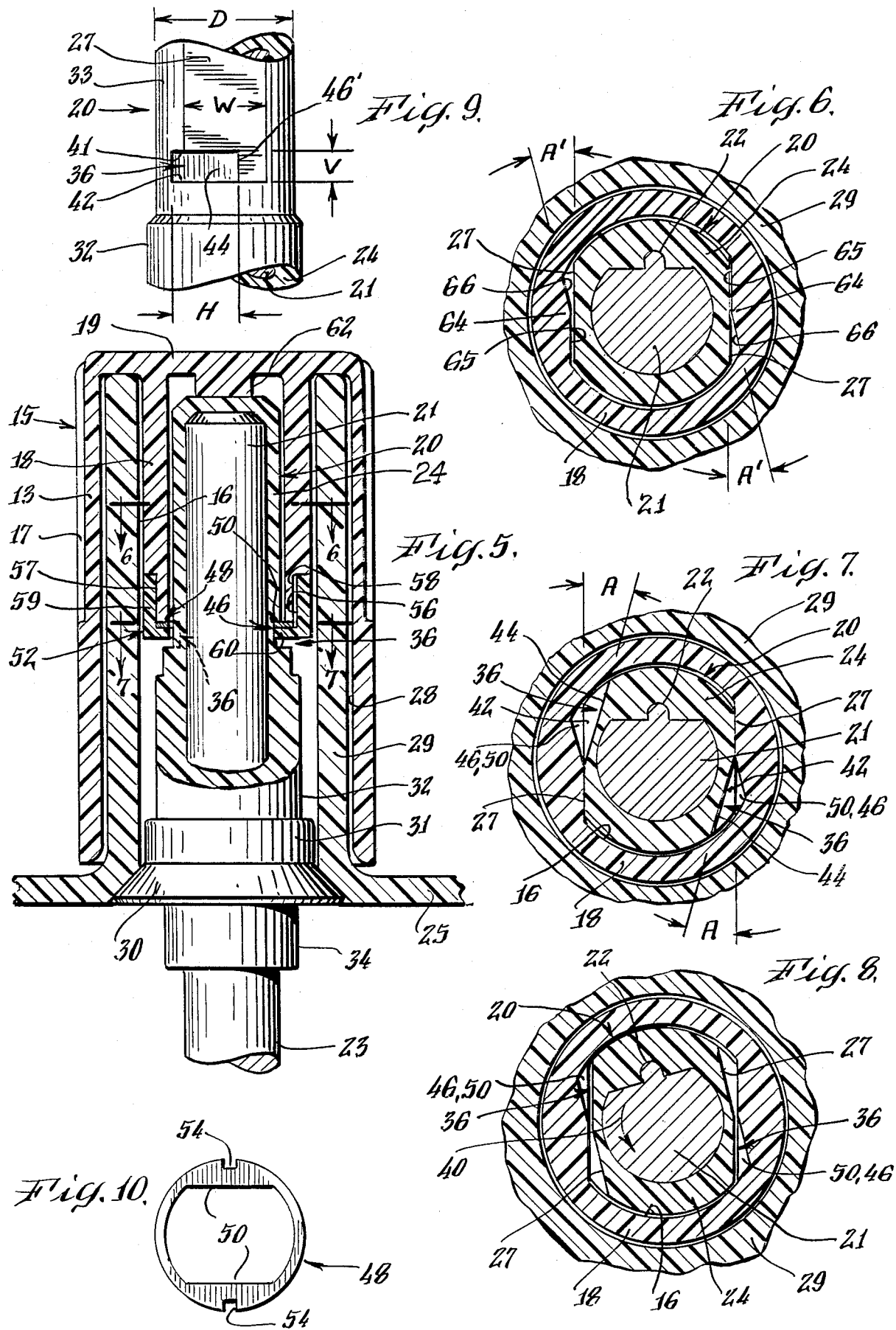

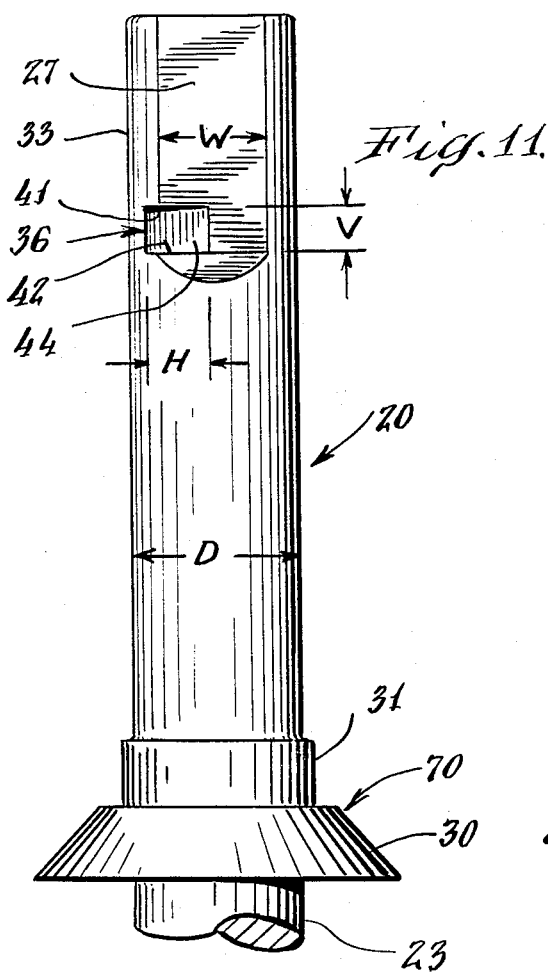
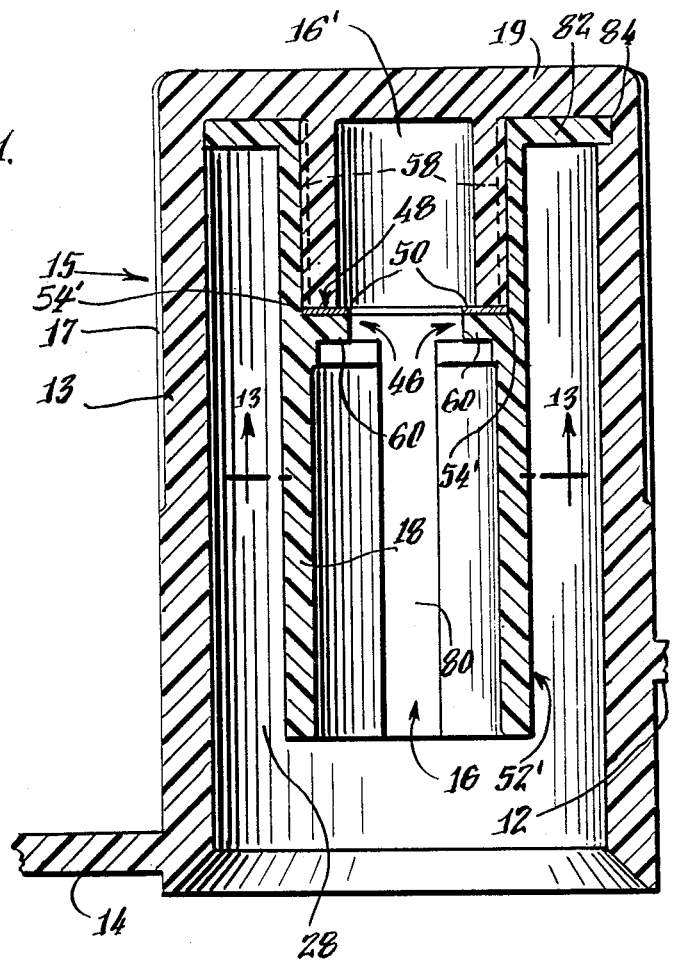
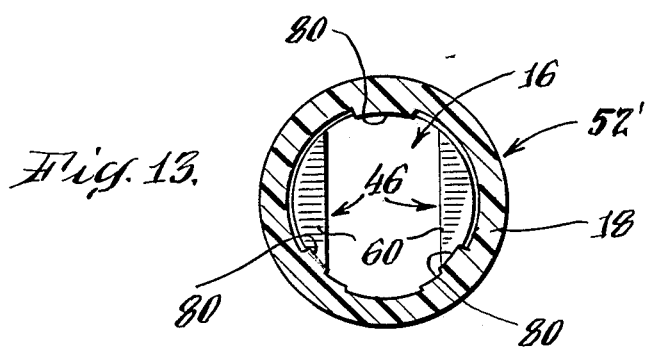

ROTATABLE TOOL POWER LOCK RETENTION APPARATUS FOR FOOD PROCESSOR

BACKGROUND OF THE INVENTION

This invention relates to food processors, and more particularly to power lock tool retention apparatus for mounting and holding a rotary tool on a vertical motor-driven shaft for preventing the tool from dynamically lifting or "riding upwardly" along this shaft during operation of the food processor.

In food processors there is a motor-driven shaft extending upward within a working bowl, and various selected rotary tools can be engaged on this shaft to be driven by the shaft for performing various food processing operations as may be desired by the user. The various rotatable tools, for example those for cutting, chopping and mincing or those for mixing and kneading have different types of blades in accordance with the food processing operation to be performed. Each tool has at least one blade screwed to a hub containing a socket and extending outwardly from the hub. When installing such a blade tool onto the shaft, the user slides the hub vertically down onto the shaft. In order to provide a driving connection between shaft and hub, the shaft is provided with at least one axially extending drive coupling means, such as a flat face. The hub socket has complementary coupling and such as at least one internal axially extending land for engaging the driving coupling means associated with the rotatable drive shaft.

Such rotary blade tools for example, have at least one blade extending outwardly from the hub, positioned relatively low down on the hub so that when the hub is mounted on the drive shaft, the blade is nearer to the bottom than to the top of the working bowl. The result is that during food processing the rapid rotation of the blade relative to the mass of the food being processed often creates a dynamic lifting action on the blade, thereby causing the tool to lift or to ride up or climb along the shaft. The clearance between the lower revolving blade and the bowl bottom progressively increases, until the blade is skimming or skipping over the upper surface of the ass of food material. This dynamic lifting of the tool can have three undesirable results. The elevated tool may not properly or fully process the food in the bowl. If the tool continues to elevate, the tool may be thrown from the upper end of the drive shaft. Or, the tool may chatter on the upper end of the drive shaft, causing undue wear.

A number of approaches have been tried in the prior art in attempts to solve this dynamic lifting problem, none of which has been completely satisfactory. For example, the upper end of the drive shaft can be screw-threaded to use a fastener or suitable nut for securing the hub to the shaft. This practice is time-consuming for the user and is unsanitary, because the food particles can be lodged in the crevices of the exposed screw thread on the upper end of the shaft.

In U.S. Pat. No. 3,493,022 Mantelet, the blade-carrying hub is connected to the drive shaft by helical splines on the lateral surface of the drive shaft engaging with corresponding shaped clearance grooves in the inner surface of the hub bore in which the pitch of the splines and grooves are selected such that one rotation of the drive shaft in its normal direction of rotation fully engages the splines in the grooves. However, in later U.S. Pat. No. 3,970,258 to the same inventor, it is disclosed that the helically grooved tool in certain cases may continue to turn through the effect of inertia when the motor is abruptly stopped and then escapes from the driving shaft, with the consequent risk of causing damage. This second Mantelet patent discloses a shaft with at least one helical driving ramp and in addition at least one helical retaining ramp, which has an active surface facing downwardly and which winds from bottom to the top in the opposite direction to the direction of rotation of the drive shaft. In a complementary manner the hub bore has at least one helical driving ramp and also at least one helical retaining ramp which finds from bottom to top in the opposite direction to the direction of rotation of the driving element and has an active surface facing upwardly. Accordingly, if the tool continues to turn after the driving motor has stopped, the hub retaining ramp will be spontaneously engaged under the retaining ramp on the drive shaft to secure the hub against escape in the upward direction. This dual ramp arrangement is complex requiring multiple ramps on both the interior surface of the hub as well as the exterior surface of the drive shaft. Furthermore, the operator may have to dislodge the complementary ramps to remove the tool which may be difficult if food particles squeeze into the ramp clearances and cause the tool to stick on the shaft.

In U.S. Pat. No. 4,127,342 - Coggiola a snap-on fastener arrangement is provided for preventing the tool from rising along the drive shaft during operation. This snap-on arrangement requires a plurality of detachable resilient retainer clips having hookable surfaces. Such resilient fastening arrangements require a forceful push by the user to achieve full engagement and have a tendency to break or become dislodged, and after periods of wear may not clip properly.

SUMMARY

Accordingly, it is an object of this invention to provide new and improved power lock retention apparatus for rotatable tools in food processors for preventing rotary blades from riding up or being elevated on the drive shaft during operation of the food processor.

Another object of this invention is to provide new and improved tool retention apparatus for a food processor which provides for automatic engagement and locking of the tool to the drive shaft when the shaft commences to rotate.

A further object of this invention is to provide new and improved tool retention apparatus for a food processor which permits convenient and rapid mounting of rotary blade tools upon a drive shaft and the removal therefrom in an easy manner without the use of tools or any time-consuming expedient and also positively locks the tool onto the drive shaft for preventing dynamic lifting of the rotary tool along the shaft during operation.

Advantageously, the torque applied to the drive shaft by the motor of the food processor automatically engages the tool onto the drive shaft in locked engagement therewith as the shaft starts to rotate and retains this locked relationship as long as the tool is being driven. At least one horizontal lip is provided in the socket of the tool hub at an elevation for becoming aligned with a horizontal notch in the drive shaft when the tool hub has been placed fully down onto the drive shaft by a convenient vertical manual downward motion. A small amount of angular movement of the drive shaft relative to the hub when the shaft commences to rotate at the start of a food processing operation causes this lip to engage in the notch for locking the hub to prevent the tool from dynamic lifting or riding upwardly along the shaft. Conversely, after completion of processing when the shaft has stopped, the cessation of torque has released the locking action. The user manually turns the tool by a small amount relative to the drive shaft for disengaging the lip from the notch, and then the tool can be removed by a convenient vertical manual upward motion.

In the illustrative embodiments of this invention in food processors having a working bowl with a vertical motor-driven shaft extending up into the bowl in which a rotatable blade tool has a hub removably engaging upon this drive shaft in driving relationship with the shaft which is provided with an axially extending driving coupling means and such a tool having at least one food processing blade secured to the hub and extending outwardly therefrom with the blade, normally being positioned on the hub relatively low in the working bowl such that the dynamic action of the blade in normal operation often tends to raise or elevate the hub upwardly along the drive shaft, power lock retention apparatus is provided for preventing the hub from being lifted upwardly relative to the drive shaft. The tool retention apparatus includes at least one flat section on the drive shaft having an associated horizontal notch. A socket extending downwardly from the top of the inside of the hub is adapted to receive and removably position the hub on the drive shaft for rotation therewith. At least one horizontal lip is provided in the socket which is aligned with the notch on the drive shaft when the hub is positioned on the shaft. The configuration of the socket is complementary but slightly different from the flattened section configuration of the drive shaft in order to permit a small amount of relative angular movement between shaft and hub which causes the lip and the notch to engage in power locked relationship and to disengage when the shaft is rotated or stopped whereby the rotatable tool positioned on the drive shaft is locked thereon when the food processor is started due to the torque of rotation of the drive shaft moving the lip into engagement with the notch and releasing such engagement upon stopping the food processor.

Advantageously, the lip in the socket automatically engages the notch in the drive shaft when the appliance is started and the drive shaft commences to rotate. The hub is readily positioned down onto the drive shaft with very little manipulation by the user and may be removed in like fashion when the processor is stopped. The prevention of the blade tool from riding upwardly along the shaft insures the proper processing of the food near the bottom of the bowl as well as preventing undue wear or damage to the equipment by the top rising near to the top of the rotary shaft.

As used herein the terms "drive shaft" and "shaft" meaning the spindle structures in food processors upon which the hubs of the tools are mounted, are intended to be interpreted broadly to include all forms of such spindles, for example such as unitary metal shafts, composite shafts of metal plus other material, composite shafts of plastic reinforced with other material and sheathed shafts including cores of one material, such as metal, sheathed with another protective material, such as plastic.

BRIEF DESCRIPTION OF THE DRAWINGS

The invention, together with further objects, aspects, features and advantages thereof will be more fully and clearly understood from a consideration of the following description taken in connection with the accompanying drawings in which like elements bear the same reference numerals throughout the various views.

FIG. 1 is an exploded perspective view of the rotatable tool power lock retention apparatus of this invention embodied in a mixing and kneading tool and the drive shaft of a food processor.

FIG. 2 is a cross-sectional view through the tool hub taken along line 2—2, of FIG. 1, looking downwardly.

FIG. 3 is a cross-sectional view through the drive shaft taken along lines 3—3 of FIG. 1, looking downwardly.

FIG. 4 is an elevational sectional view-showing a rotary food processing blade tool installed on a drive shaft of a food processor with the rotary tool being located in the interior of the working bowl.

FIG. 5 is a enlarged sectional view of the hub of the rotary food processing tool with its socket mounted on the drive shaft of the food processor, Section 5—5 in FIG. 4.

FIG. 6 is a cross-sectional view taken along line 6—6 of FIG. 5, looking downwardly.

FIG. 7 is a cross-sectional view taken along line 7—7 of FIG. 5, looking downwardly.

FIG. 8 is a cross-sectional view similar to that shown in FIG. 7 with the horizontal lips on the inside of the hub socket in engagement with horizontal notches in the drive shaft of the food processor.

FIG. 9 is an enlarged elevational view of the portion of the drive containing the tool-locking notches.

FIG. 10 is an enlarged plan view of a metal reinforcing ring included in the horizontal lips in the hub socket.

FIG. 11 is an enlarged elevational view of an integral steel drive shaft.

FIG. 12 is an enlarged elevational sectional view of a tool hub adapted for mounting onto the drive shaft of FIG. 11.

FIG. 13 is a partial cross-sectional view through the socket of the tool hub taken along line 13—13 in FIG. 12, looking upwardly.

DESCRIPTION OF THE PREFERRED EMBODIMENTS

Referring now to FIGS. 1 through 3, a rotary food processing tool, referred to generally with the reference numeral 10 is illustrated as a mixing and kneading tool, sometimes called a "dough blade", having two integrally molded horizontal blades 12 and 14 which can, for example, be in generally crescent form as seen in plan view in FIG. 2. The blades 12 and 14 extend outwardly from a hub 15 having an inner axially extending socket 16 formed by a tubular cylindrical wall 18 which extends downwardly from the top 19 of the hub. This socket 16 fits snugly onto the tool drive shaft 20 of a food processor. This drive shaft 20 includes an inner steel core 21 (see FIG. 4) having keyway means 22 extending axially along the upper end of this steel core. As shown in FIG. 4 this steel core 21 is an upward extension of the motor shaft 23 of the food processor. The drive shaft 20 includes a protective sheath 24 of tough durable plastic keyed in positive drive relationship onto the keyway means 22 so that the steel core 21 and its sheath 24 rotate together as a unit.

It is to be noted that the invention is for the prevention of tool lift on the drive shaft of a food processor and thus applies to rotary blade tools having at least one blade such as blade 12 or 14 which rotates relatively near to the bottom 25 of the working bowl 26 of the food processor. Such rotary blade tools include those used for cutting, chopping, mincing, pureeing, and the like, and those used for mixing and kneading, and the like.

The tool hub 15 includes an outer tubular cylindrical wall 13 (FIG. 2) joined to the inner wall 18 by the top wall 19. For convenience of the use in grasping the hub 15, the outer surface of the cylindrical wall 13 may include a plurality of uniformly spaced, axially extending grooves 17. The blades 12 and 14 are integrally molded with the outer wall 13. The annular hollow region 28 between the inner and outer hub walls 18 and 13 provides clearance for receiving the upstanding well 29 (FIG. 4) on the bottom of the bowl 26. Except for the lower end of the inner tubular wall 18, the whole tool 10 is integrally molded of tough durable plastic, for example, such as glass-fiber-reinforced Nylon.

Although in this embodiment of the present invention as described there is a shaft sheath 24 of tough, durable plastic, for example, glass-fiber-reinforced Nylon, which fits onto the extension 21 of the motor shaft 23 of the food processor, it is to be understood that the tool 10 may be coupled directly onto an all metal shaft, which may be preferable in the case of larger food processors because an all metal shaft is stronger.

As will best be seen in FIGS. 1 and 4 the shaft sheath 24 has a lower downwardly flared skirt 30 with a relatively short circular cylindrical surface 31 of largest outside diameter (O.D.) immediately above this skirt. Then, there is an intermediate length circular cylindrical surface 32 of intermediate O.D. Above this intermediate surface 32 there is a cylindrical surface 33 of smallest O.D. interrupted by a pair of opposed parallel flat sections or flat faces 27 extending down from the upper end of the tool drive shaft. At the lower end of the sheath 24 there is a sealing collar 34 (FIG. 4) of wear-resistant bearing metal, for example of brass, for forming a rotating seal with an encircling sealing element (not shown) in the food processor for preventing liquid from running down along the motor shaft 23.

In order to lock the tool hub 15 to the drive shaft 20, the shaft 24 includes a pair of diametrically opposed, horizontally oriented notches 36 (FIGS. 1 and 3). These notches 36 are located in the lower portion of each flat 27 in the trailing (rear) portion of each flat relative to the direction of rotation of the drive shaft 20 as indicated by an arrow 40. Although these notches 36 are preferably positioned in the lower end of the flattened sections 27, the notches may be placed anywhere along the flat regions 27 as long as they are symmetrically placed and cooperate with lips in the socket 16 as will be described later.

Since the purpose of these tool-locking notches 36 is to enable a respective lip in the socket to engage into each notch, the vertical dimension V (FIG. 9) may be relatively small. This dimension may be only a small amount larger than the vertical extent of the lip, for example, the dimension V is shown as being on the order of 3/32 to 5/32 of an inch (2 to 4 millimeters). The undercut shape of these tool-locking notches 36 is most clearly seen in FIGS. 7 and 8. The inner or rear surface 44 of each notch is planar and is oriented at an angle A (FIG. 7) in the range from 10° to 25° to the adjacent associated flat face 27, and the preferred angle A, as shown, is approximately 16°.

The vertical line of juncture 46' (FIG. 9) where the angled back surface 44 merges with the flat face 27 is positioned slightly more than half way across the width W of the flat face 27 for providing appropriate depth in the notch 36 and for providing clearance for the lip to engage into the notch. In this embodiment the width W is approximately 0.35 of an inch (8 to 9 mm) and the shaft diameter D is approximately 0.60 of an inch (15 to 16 mm). The horizontal dimension H of the notch 36, as seen in FIG. 9, is approximately 0.26 of an inch (6 to 7 mm).

In order to engage in each notch 36 in locking relation for preventing tool lift there are a pair of horizontal lips 46 projecting inwardly from opposite sides of the lower end of the hub socket 16. These lips or ledges 46 are formed by a strong, thin stainless steel ring 48 (FIG. 10) having a pair of internal flat segments 50 supported and held in place by a retainer ring, end-cap 52 (FIG. 5) of tough durable hard shear-resistant plastic, for example such as glass-fiber-reinforced Nylon.

The outer surface of the lower end of the socket wall 18 is rabbeted (cut away) at 57 (FIG. 5) for receiving an upstanding skirt 59 on the retainer end-cap 52, as seen most clearly at the left in FIG. 5.

The steel ring 48 includes a pair of external locator recesses 54 near the central portion of each flat segment 50. The inner surface of the upstanding skirt 59 of the retainer end-cap 52 has two internal axially extending ribs or keys 56 (only one is seen in FIG. 5) which fit firmly into these locator recesses 54 and also fit into axially extending channels (or keyways) 58 (only one is seen in FIG. 5) of the rabbet surface 57 of the socket wall 18. Thus, the steel ring 48 is firmly held in place by the keys 56 fitting into recesses 54 and keyways 58 for resisting angular displacement due to driving torque. A plurality of additional ribs and channels (not shown) engaging between the skirt 59 and the rabbet surface 57 serve to secure the end cap 52 strongly to the lower end of the socket wall 18. Also, the end-cap 52 is bonded to the socket wall 18 for completing assembly. The retainer end-cap 52 has a pair of internal lip portions 60 (only one is seen in FIG. 5) which underlie and are similar in shape to the straight edges of the segments 50 of ring 48.

Thus, the lips or ledges 46 comprise the straight edges of the metal ring segments 50 plus the underlying rigid plastic lip portions 60 of the retainer end-cap 52, as seen at the right in FIG. 5. The metal segments 50 are exposed in the upward direction, as seen at 46,50 in FIG. 7, along the rear portion of each lip for being available to engage beneath the overhanging notch surface 41 (FIG. 9) as will be explained later.

The lower surface of the top wall 19 of the hub 15 includes a downwardly projecting locator stop 62 (FIG. 5) which rests upon the top of the drive shaft 20 when the user places the hub down onto the drive shaft. The lips 46 are thus positioned at an appropriate elevation for engaging in the notches 36 when the shaft starts to turn, as will be explained later.

The flats 27 serve to couple (transfer) driving torque from the drive shaft 20 to the hub socket wall 18. In order to engage these flats 27 the socket wall 18 has a pair of diametrically opposed axially extending internal lands (ridges) 64 (FIG. 6). Each ridge 64 includes first and second axially extending planar surfaces 65 and 66 which are angled one with respect to the other at an angle A', which is approximately equal to the angle A between the inner surface 44 of the notches 36 and the adjacent flat 27 on the drive shaft. The first surface 65 faces forwardly i.e. faces in the direction 40 (FIG. 8) toward which the drive shaft will rotate when it is driven by the motor in the food processor. The second surface 66 faces rearwardly.

When the user initially places the hub 15 down onto drive shaft 20, the forwardly facing surfaces 65 slide FIG. 6) down along the flats 27 of the drive shaft. The rearwardly facing surfaces 66 are angularly displaced away from the flats 27 by the angle A'.

As shown in FIG. 7, in the initial position of the tool hub relative to the drive shaft 20, the lips or ledges 46 can slide down along the flats 27 of the drive shaft. The lips 46 are angularly displaced away from the rear surface 44 of the notches 36 by the angle A.

As shown in FIG. 8, when the motor starts to rotate, at shown at 40, the drive shaft 20, turns relative to the hub through a small angular displacement equal to the angle A' (FIG. 6) causing the flats 27 to abut against the rearwardly facing surfaces 66. It is this abutting of the flats 27 against the rearwardly facing surfaces 66 which transfers (couples) torque from the rotating shaft to the hub form causing the tool 10 (FIGS. 1 and 2) to rotate with the shaft.

That small angular displacement of the drive shaft relative to the hub, as described above, causes the lips 46 to enter the notches 36 with the steel portions 50 of the lips becoming engaged beneath the upper overhanging surfaces 41 (FIG. 9) of the notches 36. Thus, advantageously, the driving power of the motor holds the lips 46 in the notches 36, thereby locking the tool against lifting for as long as the drive shaft is rotating, as shown at 40.

When the driving power is shut off, the user manually turns the hub forward through the same small angular displacement relative to the stationary drive shaft thereby removing the lips 46 from the notches 36, releasing the hub for manual removal by lifting it straight up.

In summary, installation of the tool 10 on the drive shaft 20 is quick and easy and is facilitated by having an imprint pattern on the top 19 of the hub 15 generally indicating the shape and orientation of the socket 16. This socket is aligned with the flats 27 on the drive shaft 20 and installed by sliding the tool hub straight down onto the drive shaft. When the driving power of the food processor is turned on, the torque created therey turns the drive shaft relative to the tool as indicated by comparing FIG. 8 with FIG. 7, so that the lips 46 in the socket 16 engage into the notches 36 in the drive shaft 20 for locking the tool against rising during operation. The small amount of relatively angular movement may advantageously be in the range from 10≧ to 25° and in the preferred example is about 15° to 17°.

Conversely, when the driving power of the food processor is turned off, the tool 10 is automatically released so that the user can conveniently remove it from the shaft for replacement, cleaning, etc.

In FIG. 11, the tool drive shaft 20 is all metal, for example being integrally formed of stainless steel and being an extension of the motor shaft 23. A rigid plastic skirt member 70 encircles the shaft 20 and forms the skirt 30 together with the largest O.D. region 31 for cooperating with the working bowl in a manner similar to that shown in FIGS. 4 and 5. Such an 11 metal drive shaft is advantageous for use in larger food processors for added strength in view of the larger driving forces involved in these larger machines.

This shaft 20 has a diameter D of approximately 0.55 of an inch (14 mm), and there are a pair of diametrically opposed axially extending flats 27 (only one can be seen in FIG. 11) having a width W of approximately 0.38 of an inch (8 to 9 mm). These flats 27 extend less than half of the length of the all-metal tool drive shaft 20 in FIG. 11 whereas, the flats 27 in FIGS. 1 and 4 extend for more than one-half of the length of the plastic-sheathed tool drive shaft.

There is a small downward sloping transition region 72 (FIG. 11) below each flat 27.

Each notch 36 (FIG. 11) is located in the lower rearward portion of the flat 27 and has a vertical height V of approximately 0.19 of an inch (4 to 5 mm) and a horizontal length H of approximately 0.19 of an inch (4 to 5 mm). The inner surface 44 is oriented at an angle of approximately 15° to 17° relative to the adjacent flat 27, such angle being comparable to the angle A in FIG. 7.

As shown in FIGS. 12 and 13, the tool hub socket 16 includes three inwardly protruding lands 80 for snugly engaging the shank of the shaft 20 below the level of the notches 36. There is a metal ring 48 included in the lips 46 which has a shape like that in FIG. 10, except that there are a plurality of outwardly projecting key lugs 54' instead of the recesses 54. These key lugs 54' engage into keyway channels 58 in the upper portion of a tubular member 52' serving as a retainer for the ring 48. This tubular retainer 52' forms the major portion of the wall 18 of the socket 16 and includes the lands 80 and also includes the lip portions 60 underlying the straight segments 50 of the ring 48. The tubular retainer 52' includes an upper flange 82 which may include a plurality of radially extending key elements 84 for firmly gripping the main body of the hub 15 when the main body of the hub is molded onto the retainer 52'.

The main body of the hub 15 in FIG. 12 is formed of tough durable plastic, for example such as glass-fiber-reinforced Nylon. The retainer 52' is preferably formed of the same material as the retainer 52.

Above the lips 46, the upper portion 16' of the socket 16 has an inner configuration like that shown in FIG. 6, including two internal ridges 64 each having dual faces 65,66.

The power lock tool retention apparatus of the present invention is simple in construction, easy to fabricate and assemble, and provides a positive locking action without the intervention or manipulation of the tool by the user either in putting it on, or taking it off of the drive shaft. The appliance itself advantageously automatically provides the powerful locking action when the drive shaft is started and, conversely, automatically unlocks when stopped.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a food processor having a working bowl with a vertical motor-driven shaft having an upwardly extending drive end extending up into the bowl and in which a rotatable tool has a hub removably placed down upon said drive end of the drive shaft in driving relationship with the shaft prior to operation of the food processor and such tool has at least one food processing blade secured to and extending outwardly from said hub said blade normally being positioned on the hub with respect to said working bowl such that the blade in normal operation contacts the food in said bowl being processed thereby tending to lift the hub upwardly along said drive shaft, wherein said motor driven shaft rotates during operation of the food processor and said drive shaft stops rotating upon stopping of the operation of the food processor, rotatable tool power lock retention apparatus for preventing said hub from being lifted upwardly relative to said drive shaft during operation comprising:

at least one flattened section having a flat extending axially upward along said drive end of said drive shaft;

said drive shaft having a notch therein in said flat, said notch extending horizontally and having an overhang of the shaft above said notch, said tool hub having an axial socket with an open bottom and a closed top, said socket having an axially extending drive surface which is spaced from said flat on said drive end of said drive shaft when said tool hub is placed down upon and completely encloses said drive end of said drive shaft for permitting a small amount of relative angular displacement between said drive shaft and said hub, said flat on said drive shaft coming into contact with said drive surface in said socket in driving relation therewith after the shaft has rotated forwardly through said small amount of annular displacement for thereafter causing the tool to rotate with the drive shaft, being driven thereby, horizontally extending lip means projecting inwardly in said socket being aligned with said notch when said hub is initially placed vertically down on said upwardly extending drive end of said drive shaft, said lip means entering said notch below said overhang when said small amount of angular displacement has occurred, said rotatable tool when placed down onto said drive end of said drive shaft becoming locked thereon due to said small relative angular displacement occurring when the food processor drive shaft starts to rotate moving said lip means of said socket into engagement in said notch in said drive end for preventing the upward lifting of the tool along said drive shaft, and the tool becoming unlocked upon stopping the food processor drive shaft for permitting rotation of the tool through said small relative angularly displacement removing said lip means in said socket covering said drive end of said drive shaft from said engagement in said notch for permitting manual lifting of the tool upwardly and off from said upwardly extending drive end of said drive shaft.

2. In a food processor, the rotatable tool power lock retention apparatus set forth in claim 1, in which said small amount of relative angular displacement movement is in a range of 10° to 25°.

3. In a food processor, the rotatable tool power lock retention apparatus set forth in claim 2, in which said relative angular displacement is approximately 15° to 17°.

4. In a food processor, the rotatable tool power lock retention apparatus set forth in claim 1, in which said axially extending drive surface in said socket has a first axially extending planar face, said axially extending planar face is positioned on an axially extending ridge protruding into said socket, and said axially extending ridge has another planar face oriented at an angle A' with respect to the plane of said first axially extending planar face, said angle A' being in a range from 10° to 25°.

5. In a food processor, the rotatable tool power lock retention apparatus set forth in claim 1, in which said notch is in the trailing portion of said flat on said drive shaft.

6. In a food processor, the rotatable tool power lock retention apparatus set forth in claim 5, in which said horizontal notch has an inner surface oriented at an angle A in the range from 10° to 25° relative to said flat as seen looking axially of the drive shaft.

7. In a food processor, the rotatable power lock retention apparatus as set forth in claim 1, in which said socket includes a plurality of axially extending inwardly protruding lands located below said lip means and snugly fitting against the drive shaft below said notch for firmly stabilizing the tool upon the shaft during rotation.

8. In a food processor, the rotatable tool power lock retention apparatus set forth in claim 7, in which said axially extending inwardly protruding lands are three in number centered at approximately 120° spacings around the axis of the socket.

9. In a food processor, the rotatable tool power lock retention apparatus set forth in claim 1, in which said horizontally extending lip means include a tough metal ring encircling the socket and having an inner edge exposed upwardly for engaging against said overhang for resisting wear.

10. In a food processor, the rotatable tool power lock retention apparatus set forth in claim 9, in which said metal ring includes at least one external recess and keying means inter-engage between said ring and the wall of the socket for firmly securing said ring against dislodgement.

11. In a food processor, the rotatable tool power lock retention apparatus set forth in claim 9, in which said metal ring includes at least one segment with a horizontal straight edge extending across said ring.

12. In a food processor, the rotatable tool power lock retention apparatus set forth in claim 11, in which said lip means also include a lip portion of said keying means underlying said horizontal straight edge.

13. For use in a food processor having a working bowl with a vertical motor-driven shaft having a drive end upstanding vertically within the bowl wherein said motor-driven shaft rotates during operation of the food processor and said drive shaft stops rotating upon stopping of the operation of the food processor and in which a rotatable food processing tool has an easily installed hub removably engaging down by a straight line manual manipulation in driving relationship with the shaft provided with axially extending driving coupling means and such tool has at least one rigid blade secured to said hub and extending therefrom normally being positioned near the bottom of the working bowl, power lock retention apparatus for preventing said tool from being lifted on said shaft during operation when said shaft is being driven in a first direction of rotation while assisting removal of said tool from said shaft in a second direction of rotation of said tool on said shaft opposite said first direction of rotation when said shaft stops comprising:
- at least one axially extending flat on said upstanding drive end of said shaft said flat having a leading and trailing portion with a horizontally extending notch therein positioned in said trailing portion of said flat with respect to said first direction of rotation of said shaft,
- said hub having a downwardly extending socket, said socket having a closed top and an open bottom,
- said socket having a complementary configuration for receiving and completely enclosing said upstanding drive end of said shaft when said hub is positioned down onto said upstanding drive end,
- horizontally extending lip means in said socket in vertical alignment with said notch when said hub is manually installed downwardly on said upstanding drive end of said shaft,
- the configuration of said socket and said flat being complementary and shaped for allowing a small amount of relative angular displacement therebetween in said first direction of rotation for causing said lip means to engage into said notch when said drive shaft is driven in said first direction of rotation thereby locking said tool on said drive shaft for preventing lifting of the tool on the shaft during operation of the food processor and the rotation of the shaft in said first direction of rotation, and
- allowing relative angular displacement of the hub in said second direction opposite to said first direction for withdrawing said lip means from said notch after the shaft has stopped being driven for freeing the hub to be lifted up vertically off from said upstanding drive end of said shaft.

14. For use in a food processor, the power lock tool retention apparatus set forth in claim 13, in which said notch is located in the lower portion of said flat on the drive shaft.

15. For use in a food processor, the power lock tool retention apparatus set forth in claim 12, in which said shaft has a pair of diametrically opposed axially extending flats and has a pair of diametrically opposed, vertically aligned, horizontally extending notches located in said trailing portions of said flats with respect to said first direction of rotation of said shaft, and said hub has a pair of diametrically opposed horizontally extending lip means vertically aligned in said socket which are in vertical alignment with the respective notches when the hub is manually installed on said shaft.

16. For use in a food processor, the power lock retention apparatus set forth in claim 13, in which said relatively angular displacement is in the range of 10° to 25°.

17. For use in a food processor, the power lock retention apparatus set forth in claim 16, wherein said relative angular displacement between said shaft and said tool is approximately 15° to 17°.

18. For use in a food processor, the power lock retention apparatus set forth in claim 13, in which said socket has three downwardly axially extending inwardly protruding lands below said lip means for snugly embracing the shank of the drive shaft below said notch for stabilizing the rotating tool on the upstanding drive end of said shaft during rotation of the shaft.

19. For use in a food processor, the power lock tool retention apparatus set forth in claim 13, in which said lip means include a tough meal ring encircling said socket with a portion of said ring being exposed facing upwardly for engaging up against an overhanging portion of the drive end of the shaft, said overhanging portion being located immediately above said notch.

* * * * *